United States Patent Office 3,509,805
Patented May 5, 1970

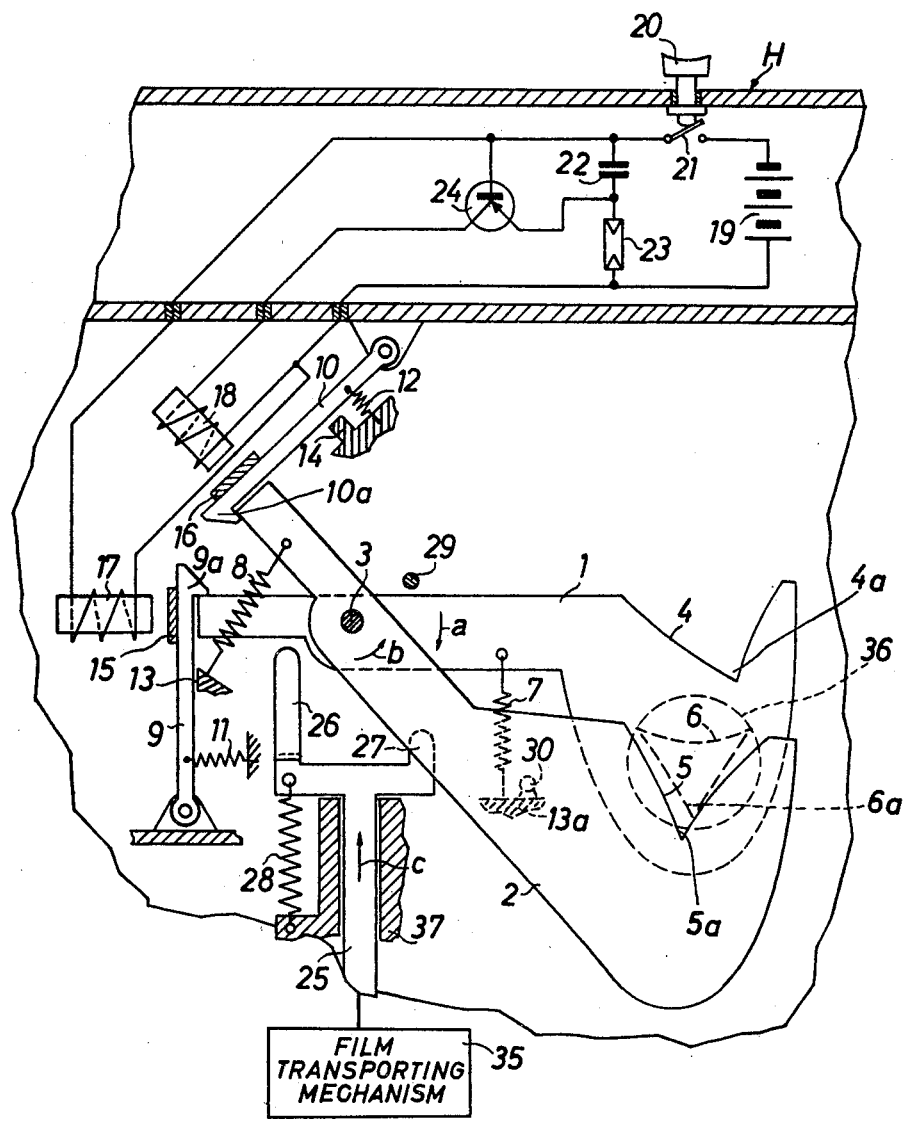

3,509,805
SHUTTER FOR PHOTOGRAPHIC CAMERAS
Dieter Engelsmann, Unterhaching, near Munich, and Hubert Hackenberg, Munich-Solln, Germany, assignors to Agfa-Gevaert Aktiengesellschaft, Leverkusen, Germany
Filed Aug. 30, 1967, Ser. No. 664,410
Claims priority, application Germany, Sept. 3, 1966,
A 53,420
Int. Cl. G01j 1/00; G03b 9/14
U.S. Cl. 95—10            9 Claims

ABSTRACT OF THE DISCLOSURE

In order to admit light to the exposure aperture, the leading and trailing blades of a diaphragm type shutter turn in opposite directions about a common pivot axis which is laterally adjacent to the aperture. The leading blade uncovers the aperture in response to movement to uncocked position on operation of the shutter release. The trailing blade covers the aperture by moving to uncocked position with a delay which is a function of the intensity of scene light. The shutter release comprises a first electromagnet which releases the leading blade in immediate response to depression of a trigger, and the retard unit which releases the trailing blade with a delay following depression of the trigger also comprises an electromagnet which is energized with a delay determined by a light-sensitive element as a function of the intensity of scene light.

The blades can be cocked in response to operation of the film transporting mechanism and each thereof is permanently biased to uncocked position.

CROSS-REFERENCE TO RELATED APPLICATION

The shutter of the present invention constitutes an improvement over shutters of the type disclosed in the co-pending application Ser. No. 617,416 and now Pat. No. 3,410,188 filed by Kiper and assigned to the same assignee.

BACKGROUND OF THE INVENTION

Our invention relates to shutters for photographic camera in general, and more particularly to improvements in automatic shutters of the type wherein the blades determine the exposure time and the size of the diaphragm aperture as a function of the intensity of scene light. Sill more particularly, the invention relates to improvements in shutters which comprise two shutter blades.

It is already known to provide a shutter with two rings the first of which moves from cocked position to pivot a set of blades which admit light to an unexposed film frame and the second of which thereupon causes the blades to close the shutter with a delay which is a function of the intensity of scene light. The second ring can be released during or subsequent to movement of the first ring to uncocked position. It is also known to provide a shutter with only two blades which move simultaneously during a first stage of movement from uncocked position to expose the aperture to scene light. The blades thereby cause a spring to store energy and when the thus stored energy suffices to overcome the force of an electromagnet whose energization depends on the intensity of scene light, the blades are free to follow the action of a return spring which reverses the direction of their movement and causes them to move back to closing position. Such shutters are rather complicated, mainly because they comprise a large number of moving parts which produce excessive frictional forces. Furthermore, the wear on a shutter wherein the blades must reverse the direction of their movement during an exposure is very high. Still further, presently known shutters of the above outline type occupy too much room which is at a premium in a still camera.

SUMMARY OF THE INVENTION

It is an important object of our invention to provide a compact, rugged and simple shutter with two blades which can determine the exposure time and the size of the exposure aperture in dependency on the intensity of scene light.

Another object of the invention is to provide a shutter with two blades which need not reverse the direction of their movement in order to terminate the admission of light to a film frame.

A further object of the invention is to provide a novel retard unit for the trailing blade of a shutter with two blades.

An additional object of the invention is to provide a shutter wherein the blades travel in opposite directions, regardless of whether thy move to cocked or uncocked positions.

Another object of the invention is to provide a shutter whose blades are cocked in automatic response to preparation of the camera for an exposure.

An ancilliary object of the invention is to provide simple and compact blocking devices which can yieldably hold the blades in cocked positions.

A concomitant object of the invention is to provide a diaphragm type shutter which comprises a relately small number of simple moving parts so that friction developing on actuation of the shutter is much less than in presently known shutters which can determine the exposure time and the size of the diaphragm aperture in dependency on the intensity of scene light.

Our invention is embodied in a diaphragm type shutter which comprises a plate or like means defining a preferably triangular exposure aperture, pivot means laterally adjacent to the exposure aperture, leading and trailing shutter blade means mounted on the pivot means and movable in opposite directions between cocked positions in which they respectively cover and uncover the exposure aperture and uncocked positions in which they respectively uncover and cover the exposure aperture, biasing means for urging the blade means to uncocked positions, first and second yieldable blocking means for respectively holding the leading and trailing blades means in cocked positions, release means preferably operated by hand to disengage the leading blade means from the first blocking means at the will of the operator so that the leading blade means may expose the aperture for entry of scene light which then impinges against an unexposed film frame, and retard means for disengaging the trailing blade means from the second blocking means subsequent to operation of the release means and with a delay which is a function of the intensity of scene light. In this way, the trailing blade means covers the exposure aperture prior or subsequent to complete uncovering of the aperture by the leading blade means to respectively define a relatively small or a maximum-size diaphragm aperture.

The release means may comprise an electromagnet which is energizable by the operator and then displaces the first blocking means from engagement with the leading blade means. The retard means may comprise a second electromagnet which is energized in response to energization of the first electromagnet but with a delay which is a function of the intensity of scene light. If the light intensity is high, the delay is shorter so that the unexposed film frame receives less light.

The novel features which are considered as characteristic of the invention are set forth in particular in the appended claims. The improved shutter itself, however, both as to its construction and its mode of operation, together will additional features and advantages thereof, will be best understood upon perusal of the following detailed description of certain specific embodiments with reference to the accompanying drawing.

BRIEF DESCRIPTION OF THE DRAWING

The single figure is a diagrammatic vertical sectional view of a shutter which embodies the present invention, both blades being shown in cocked positions.

DESCRIPTION OF THE PREFERRED EMBODIMENTS

The drawing illustrates the housing H of a photographic still camera which embodies the improved diaphragm type shutter. The latter comprises two shutter blades 1, 2 each of which resemblies a two-armed lever. These blades are turnable about the axis of a common pivot pin 3 which is attached to the housing H and is laterally adjacent to a triangular exposure aperture 6 provided in a plate or wall 36 of the housing H. This wall 36 is located in front of the path in which a film transporting mechanism 35 transports the film stepwise in such a way that an unexposed film frame registers with the aperture 6 when the film transporting mechanism has been operated by the user of the camera. The right-hand arms of the blades 1, 2 are respectively provided with triangular notches 4, 5 having corner portions 4a, 5a whose orientation is the same as that of the lower corner portion 6a of the exposure aperture 6. The blade 1 is the leading blade and, when moved to the cocked position which is shown in the drawing, it covers the exposure aperture 6 because its notch 4 is located at a level above the aperture. The blade 2 is the trailing shutter blade and, when maintained in the cocked position which is shown in the drawing, its notch 5 registers with the aperture 6 but the latter cannot receive scene light because it is covered by the leading blade 1. The means for permanently biasing the blades 1, 2 to uncocked positions comprises two helical springs 7, 8 which tend to turn these blades in opposite directions. As shown, the spring 7 operates between the right-hand arm of the blade 1 and a stationary part 13a of the housing H. The spring 8 operates between the left-hand arm of the blade 2 and a stationary stop 13 of the housing H.

The shutter further comprises two blocking pawls 9, 10 which respectively hold the leading and trailing blades 1, 2 in cocked positions until the operator decides to make an exposure in response to operation of a shutter release which includes a trigger or pushbutton 20 mounted in the top wall of the housing H and an electric circuit including an electromagnet 17, a normally open master switch 21 in series with the electromagnet 17, and a source 19 of electrical energy (e.g., one or more batteries or miniature cells) connected in series with the master switch 21 and electromagnet 17. The blocking pawl 9 constitutes the armature of the electromagnet 17 and is automatically disengaged from the left-hand arm of the leading shutter blade 1 when the electromagnet 17 is energized in response to closing of the master switch 21 by the pushbutton 20. A spring 11 biases the blocking pawl 8 into abutment with the stop 13. In such blocking position, the pallet 9a of the pawl 9 engages the left-hand arm of the leading blade 1 and holds the latter in cocked position against the bias of the spring 7. The pawl 9 carries a magnetizable plate 15 which is attracted by the electromagnet 17 when the latter is energized in response to depression of the pushbutton 20. The second blocking pawl 10 is biased by a spring 12 which tends to maintain it in abutment with a stop 14 of the housing H; the pallet 10a of the pawl 10 then engages the left-hand arm of the trailing shutter blade 2 and holds the latter in cocked position against the bias of the spring 8. This second blocking pawl 10 carries a magnetizable plate 16 and constitutes the armature of a second electromagnet 18 which forms part of a retard unit for the trailing blade 2, the retard unit being operative to disengage the blade 2 from the blocking pawl 10 in response to depression of the pushbutton 20 but with a delay which is a function of the intensity of scene light. The retard unit further includes a capacitor 22 connected in series with a light-sensitive resistor 23 and in parallel with the energy source 19, and a triode 24 which is connected in series with the electromagnet 18 but in parallel with the capacitor 22. The emitter of the triode 24 is connected to a tap between the capacitor 22 and resistor 23, the latter being mounted on the front wall of the housing H or in another position in which it can be exposed to scene light.

The cocking means for the blades 1, 2 comprises a slide 25 which is guided in a bearing 37 of the housing H and carries two prongs 26, 27 which can respectively engage the left-hand arm of the trailing blade 2 and the right-hand arm of the leading blade 1. When moved in the direction indicated by arrow c, the slide 25 respectively turns the blades 1 and 2 in a counterclockwise and in a clockwise direction to move them to the cocked positions shown in the drawing. In the illustrated embodiment, the slide 25 is permanently biased to retracted position by a spring 28 which urges it into abutment with the top surface of the bearing 37. When the operator manipulates the film transporting mechanism 35 to advance the film by the length of a frame, the slide 25 moves upwardly and cocks the blades 1, 2 in automatic response to transport of the film. If desired, the slide 25 can be moved upwardly by a separate actuating device or the pushbutton 20 can be installed in such a way that it cocks the blades 1, 2 prior to closing of the master switch 21. Stationary stop pins 29, 30 are provided to automatically arrest the blades 2, 1 in uncocked positions.

The operation is as follows:

If the user wishes to make an exposure, the film transporting mechanism 35 is manipulated to place an unexposed film frame into registry with the objective (not shown) and with the exposure aperture 6. The mechanism 35 then causes the slide 25 to cock the blades 1, 2 so that these blades assume the positions shown in the drawing. During cocking of the blade 2, the end portion of its left-hand arm slides along the inclined edge face of the pallet 10a on the pawl 10 whereupon the spring 12 contracts and causes the pawl 10 to engage and hold the blade 2 in cocked position. The prong 27 turns the blade 1 in a counterclockwise direction whereby the left-hand end portion of the blade 1 slides along the inclined edge face of the pallet 9a on the pawl 9 until the latter snaps to blocking position under the action of spring 11.

The user thereupon depresses the pushbutton 20 to close the master switch 21. The electromagnet 17 is energized in immediate response to closing of the switch 21 because its winding is then connected with the two poles of the energy source 19. The electromagnet 17 attracts its armature (blocking pawl 9) so that the latter releases the leading blade 1 which is biased by the spring 7 so that it turns about the pivot pin 3 (arrow a) ultimately engages the stop pin 30 whereby the notch 4 registers with the exposure aperture 6.

The capacitor 22 is charged through the light-sensitive resistor 23 in response to closing of the master switch 21. The resistance offered by the resistor 23 to the flow of current is a function of the intensity of scene light, i.e., the delay with which the capacitor 22 is charged to a predetermined extent in response to closing of the master switch 21 is also a function of the intensity of scene light. When the capacitor 22 is charged to such predetermined extent, current can flow through the triode 24 and the electromagnet 18 is energized to attract its armature (blocking pawl 10) whereby the trailing blade 2 turns in a counterclockwise direction (arrow b) and moves its notch 5 out of registry with the aperture 6 to terminate the exposure. When in uncocked position, the trailing blade 2 bears against the stop pin 29. It will be seen that, during movement of blades 1, 2 to uncocked positions, the notches 4, 5 travel in opposite directions (arrows *a* and *b*).

The blades 1, 2 not only determine the exposure time but also the size of the diaphragm aperture, i.e., the size of that opening which actually admits light to the aperture 6 and to an unexposed film frame. The size of the diaphragm aperture will reach a maximum value if the delay with which the electromagnet 18 is energized subsequent to operation of the shutter release (energization of electromagnet 17 in response to closing of the master switch 21) is sufficient to insure that the blade 1 assumes the uncocked position (abutment with the stop pin 30) before the blocking pawl 10 releases the trailing blade 2. If the intensity of scene light is high, the delay is very short so that the trailing blade 2 can be released even before the leading blade 1 reaches its uncocked position whereby only a portion of the aperture 6 admits light to an unexposed film frame.

The camera is ready to make a fresh exposure in response to operation of the film transporting mechanism 35 which causes the slide 25 to return the blades 1, 2 to cocked positions. During such return movement of blades 1, 2 to cocked positions, the right-hand arms of these blades cooperate to prevent admission of light to the aperture 6.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What is claimed as new and desired to be protected by Letters Patent is set forth in the appended claims.

What is claimed is:

1. A diaphragm type shutter, comprising means defining an exposure aperture; pivot means adjacent to said aperture; a single leading shutter blade and a single trailing shutter blade, and blades being mounted on said pivot means and being movable in opposite directions from cocked positions in which they respectively cover and uncover said aperture; biasing means for urging said blades to uncocked positions; first and second yieldable blocking means for respectively holding said leading and trailing blades in cocked positions, each of said blocking means comprising a pawl movable between holding and disengaged positions; release means operative to disengage said leading blade from said first blocking means; and retard means for disengaging said trailing blade from said second blocking means with a delay which is a function of the intensity of scene light.

2. A diaphragm type shutter, comprising means defining an exposure aperture having a polygonal outline and a plurality of corner portions; pivot means adjacent to said aperture; a single leading shutter blade and a single trailing shutter blade, each of said blades having a notch of polygonal outline and each of said notches having a corner portion having the same orientation as one corner portion of said aperture, said blades being mounted on said pivot means and being movable in opposite directions from cocked positions in which they respectively cover and uncover said aperture to uncocked positions in which they respectively uncover and cover said aperture; biasing means for urging said blades to uncocked positions; first and second yieldable blocking means for respectively holding said leading and trailing blades in cocked positions; release means operative to disengage said leading blade from said first blocking means; and retard means for disengaging said trailing blade from said second blocking means with a delay which is a function of the intensity of scene light.

3. A shutter as defined in claim 2, wherein said pivot means defines a common pivot axis for said leading and trailing blades.

4. A shutter as defined in claim 2, wherein said release means comprises normally deenergized electromagnet means and means for energizing said electromagnet means, said first blocking means constituting the armature of said electromagnet means and being disengaged from said leading blade in response to energization of said electromagnet means.

5. A shutter as defined in claim 2, wherein said retard means comprises normally deenergized electromagnet means and means for energizing said electromagnet means in response to operation of said release means and with a delay which is a function of the intensity of scene light, said second blocking constituting the armature of said electromagnet means and being disengaged from said trailing blade means in response to energization of said electromagnet means.

6. A shutter as defined in claim 2, wherein said aperture and said notches are of triangular outline and wherein the notches of said leading and trailing blades respectively register with said aperture in the uncocked and cocked positions of said leading and trailing blades.

7. A shutter as defined in claim 2, further comprising cocking means for moving said blades to cocked positions.

8. A shutter as defined in claim 7, wherein said cocking means is responsive to operation of the film transporting mechanism in a photographic camera.

9. A shutter as defined in claim 2, further comprising stop means for automatically arresting said blades in uncocked positions.

References Cited
UNITED STATES PATENTS

| | | | |
|---|---|---|---|
| 340,213 | 4/1886 | Hoedemaker et al. | 95—62 XR |
| 3,059,556 | 10/1962 | Hell et al. | 95—31 |
| 3,208,365 | 9/1965 | Cooper et al. | |
| 3,358,575 | 12/1967 | Kitai | 95—63 |
| 3,373,672 | 3/1968 | Ichijo et al. | 95—63 |
| 3,375,769 | 4/1968 | Kiper | 95—63 |
| 3,410,188 | 11/1968 | Kiper | 95—63 XR |

NORTON ANSHER, Primary Examiner

D. S. STALLARD, Assistant Examiner

U.S. Cl. X.R.

95—31, 62